June 19, 1956  R. L. BOWERS ET AL  2,751,085
FILTER FOR TREATMENT OF LIQUID
Filed May 3, 1951
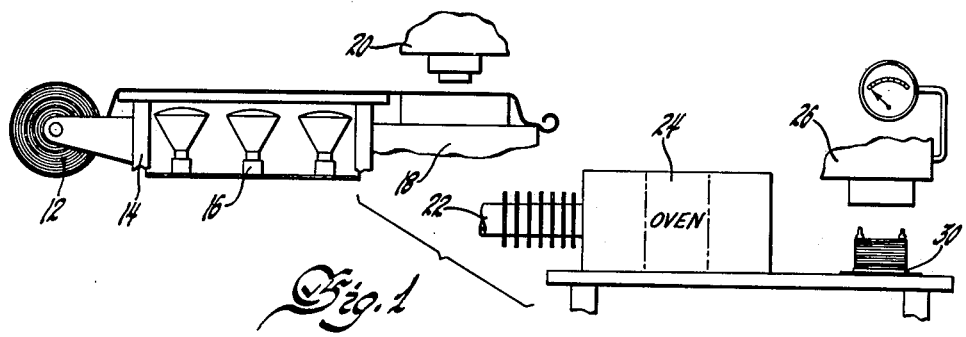
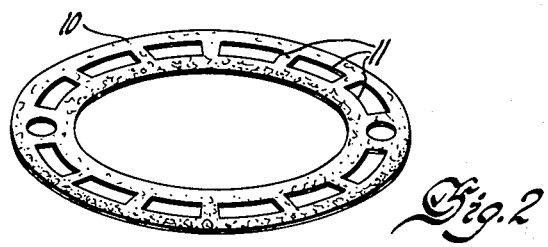
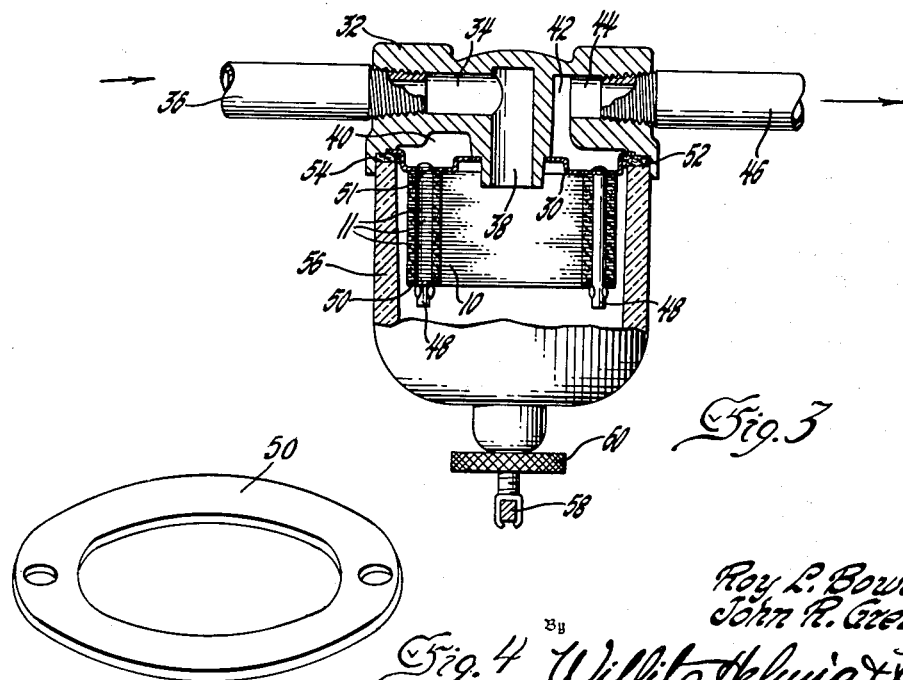
Inventors
Roy L. Bowers &
John R. Gretzinger
By Willits, Helwig & Baillio
Attorneys United States Patent Office 2,751,085
Patented June 19, 1956

2,751,085

FILTER FOR TREATMENT OF LIQUID

Roy L. Bowers, Flint, Mich., and John R. Gretzinger, Kansas City, Kans., assignors to General Motors Corporation, Detroit, Mich., a corporation of Delaware Application May 3, 1951, Serial No. 224,346

1 Claim. (Cl. 210—169)

This invention relates to an improved porous paper strainer element for removing particles of foreign matter from liquids.

The strainer elements which are now used for light petroleum materials such as gasoline, are generally of the edge type. The filter elements are made up of a plurality of rings made of metal or fully impregnated paper that is entirely impervious to the fluid being filtered. The rings of material are separated by suitable means so that the filtration takes place entirely between the filter rings. Though filters of this type are satisfactory and have been used for many applications, difficulties have been encountered to provide a high capacity filter needed for present automotive requirements in the small space allotted for the fuel strainer. The improvements in the last few years in the automotive carburation field have produced finer nozzles which require improved filters. The edge type filter has heretofore not been able to meet these requirements for higher volume and purity without being increased in size so much so that it would not fit in the space allotted in the present automotive design. The filter element of the present invention consists of a plurality of rings formed of porous paper partially impregnated with a resin insoluble in the liquid to be filtered so that the fibers of the material are fully coated but the rings do not exhibit any substantial reduction in porosity. A plurality of outlet openings are provided in each of the rings and these openings are aligned to form outlet passages. Thus the fluid passes through the paper material sideways and into the center outlet openings.

The primary object of this invention is to provide an improved filter having a porous paper filter element in which the fluid enters the paper through an edge, passes through the paper edgewise and leaves through another edge.

Another object of the invention is to provide an improved filter having a porous paper filter element in which the fluid passes through the paper edgewise or lengthwise and wherein the paper is impregnated with a resin to coat the fibers but not to substantially reduce the porosity.

Further objects and advantages of the present invention will be apparent from the following description, reference being had to the accompanying drawing wherein a preferred embodiment of the present invention is clearly shown.

Figure 1 is a diagrammatic illustration of the apparatus employed in the process of manufacturing and assembling this filter element.

Figure 2 is an enlarged detail view showing one filter ring.

Figure 3 is an elevation with parts and section of a filter employing the filter element illustrating the principles of this invention.

Figure 4 is an enlarged detail view showing the backing ring.

A filter element of the type employed to filter automotive fuels such as gasoline is employed to illustrate the invention. The filter rings 10 are manufactured from a porous linter type paper impregnated with a phenolic resin. Such paper is organic in structure and should be formed with the fibers parallel with the surfaces and have a uniform porosity to prevent particles over 40 microns in diameter passing through. The paper is also uncreped and does not have sizing added. The resin is preferably a phenol formaldehyde thermosetting resin catalized in the presence of caustic soda or sodium hydroxide but may be a phenol or cresol aldehyde resin. The phenol formaldehyde resin used has a specific gravity at 25° C. of 1.110 to 1.120, a solids content of 60 to 70%, a weight of 9.28 to 9.35 pound per gallon, a viscosity at 25° C. of 200 to 400 centipoises and is dissolved in a suitable solvent such as ethanol. The paper is impregnated with this resin so that 32 to 38% of the finished cured paper is resin. This provides an impregnation of resin which coats the fibers but does not fill the spaces between the fibers or reduce the porosity of the paper.

The paper 12 in a suitable roll is supported on the end of a drying table 14 having a plurality of infra red heat lamps 16. The paper 12 passes over the infra red lamps 16 at a speed so that the resin impregnated paper is precured approximately 12% so that the paper will shear cleanly without cracking and not leave the resin deposit on the die. Thus the precuring required for various types of resins would vary between approximately 5 to 25 percent precuring. The strip of paper material then passes to the punch press 18 where a suitable punch die 20 continuously punches out rings 10 from the strip of paper 12. The rings 10 are then placed on a mandril 22 and passed through an oven 24 where the paper rings are cured for approximately 30 minutes at a temperature of approximately 350° F. The rings 10 are then assembled on the filter element frame 30 and staked in position under a pressure of 11 pounds maintained by the hydraulic press 26. This pressure may vary between approximately 7 and 15 pounds with various papers to obtain substantially equal porosity between and through the discs.

Referring to Figure 3 a strainer element including the frame 30 and a plurality of rings 10 will be seen positioned in a filter housing comprising a head 32. The filter housing head 32 has a radial inlet port 34 which is suitably connected by a threaded joint to the inlet pipe 36. The inlet port 34 extends to the center of the head 32 and connects with the downwardly extending inlet channel 38. The head 32 also has an annular outlet recess 40 surrounding the inlet channel 38. The outlet recess 40 is connected by the vertical passage 42 to the radial outlet port 44 which is suitably connected to the outlet pipe 46.

The filter element consists of a plurality of filter rings 10 secured by oppositely disposed elongated rivets 48 passing through a group of filter rings 10 and being secured at opposed ends to the filter frame 30 and a backing ring 50. The frame 30 comprises a top portion or backing member, rivets 48, and the backing ring 50. The backing member has an annular and outwardly extending flange to be engaged by the gasket 54 and an annular depressed portion provided with the arcuate openings 51. The backing flange is adapted to serve as a supporting means for the filtering element. Thus the filter rings are secured together with the proper degree of compression between the frame 30 or backing member and the backing ring 50 by the rivets 48. It will be noted that the inner and the outer edges of the frame 30 engage shoulders on the filter head 32 to seal the frame to the filter element to enclose the annular outlet recess 40 and provide a passage. A gasket 52 is positioned over the outer edge of the frame 30 in the recess 54 of the head 32 to provide a seal for the joinder of a bowl 56 which cooperates with the head 32 to enclose the filter. The filter housing bowl is generally but not necessarily made of glass and in the shape of a cup. The housing bowl 56 is secured to the filter head 32 by the conventional bail 58 shown in cross section in Figure 3. Both ends of the bail 58 are pivoted in the conventional manner to the head 32. A suitable adjustable thumb screw 60 is positioned between the bail and the housing bowl 56 so that the bowl may be clamped against the head in sealing relation with the gasket 52, and clamp the frame 30 to the head 32 to hold the filter unit in position.

Referring to Figure 2 it will be seen that each ring 10 has a plurality of outlet openings 11. When the filter rings 10 are assembled in a stacked relation, for positioning on the filter frame, the outlet openings 11 are positioned in aligned relationship to provide an outlet passage. The outlet passage formed by the aligned openings 11 are also in alignment with the suitable openings 51 in the frame 30 so that the filter fluid may pass up through the aligned outlet openings 11 and through the openings in the frame 30 to the outlet recess 40 and thus through the outlet pipe 46. The backing ring 50 covers the openings 11 in the bottom ring 10 and thus seals the lower end of the outlet passages in the filter element.

Though it is believed that the operation of this filter will be quite clear from the above description, it will readily be seen that the unfiltered fluid enters through the pipe 30 and enters the center of the filter cup 56 through the passage 38. The unfiltered fluid then surrounds the filter element consisting of the stack of rings 10. The fluid is then filtered as it passes through the paper and between the layers of paper to enter the outlet openings 11. Since the fibers of this paper are laid parallel to the surfaces of the paper, the individual fibers are presented essentially endwise and sidewise with respect to the fluid entering the paper. This arrangement results in a more open or porous formation than would be obtained if the fluid entered the sheet of paper perpendicular to and through a surface. The rings are held together with the proper pressure of about 11 pounds to obtain substantially equal porosity between and through the paper rings. Though the percentage of resin employed to impregnate the fibrous material or paper may vary widely when various types of paper and resin are employed, it is important that sufficient resin be employed to prevent softening and disintegration of the paper by the fluid and to prevent crushing of the paper and that insufficient resin be used to clog the pores. The pressure employed to hold the rings together may vary over a wide range for different types of paper and resin impregnation but should always provide substantially equal porosity and filtering capacity both through and between the paper rings and to hold the rings flat without crushing. The fluid in the outlet openings 11 then passes upwardly through the outlet passage consisting of a plurality of the aligned openings 11. The filtered fluid then passes through the frame 30 into the annular recess 40 and through the upwardly extending passage 42 to the outlet port 44 and pipe 46.

The above detailed description of the preferred embodiment of the invention is not to be considered as limiting the invention since many modifications of structure will occur to those skilled in the art within the scope of the invention.

We claim:

A filtering element for treating liquid adapted to be supported in a housing having a central inlet and an annular outlet chamber, said element comprising paper rings impregnated with a cured resin, said rings when assembled and held under compression forming a cylindrical stack of homogeneous porosity, said paper rings being formed of a linter-type paper having substantially parallel fibers and having a porosity to stop particles over 40 microns, said resin being of the order of 32 to 38 per cent content of the assembled stack and coating the fibers in a manner which retains the porosity of the rings, a rigid annular member with an outwardly extending supporting flange at one end of said stack to form a seal around said central inlet, said paper rings and said annular member having aligned arcuate openings forming passages leading to said outlet chamber, a rigid annular ring arranged at the other end of said stack terminating said passages; and means joining said annular member and rigid ring holding said stack under compression.

References Cited in the file of this patent

UNITED STATES PATENTS

| | | |
|---|---|---|
| 942,700 | Baekeland | Dec. 7, 1909 |
| 1,595,811 | Anderson | Aug. 10, 1926 |
| 2,103,572 | Wells | Dec. 28, 1937 |
| 2,159,196 | Babitch | May 23, 1939 |
| 2,359,475 | Gauthier | Oct. 3, 1944 |
| 2,360,020 | Skinner et al. | Oct. 10, 1944 |
| 2,382,278 | Widmann | Aug. 14, 1945 |
| 2,426,405 | McDermott | Aug. 26, 1947 |
| 2,437,082 | Davis et al. | Mar. 2, 1948 |
| 2,455,486 | Hicks | Dec. 7, 1948 |
| 2,521,060 | Hallinan | Sept. 5, 1950 |
| 2,554,814 | Catlin et al. | May 29, 1951 |
| 2,680,519 | Rundquist et al. | June 8, 1954 |